(12) United States Patent
Eroshenko

(10) Patent No.: US 8,925,697 B2
(45) Date of Patent: Jan. 6, 2015

(54) VIRTUALLY OIL-FREE SHOCK ABSORBER HAVING HIGH DISSIPATIVE CAPACITY

(75) Inventor: Valentin Eroshenko, Tarbes (FR)

(73) Assignee: Walden Associates Ltd., S.A., Panama (PA)

( * ) Notice: Subject to any disclaimer, the term of this patent is extended or adjusted under 35 U.S.C. 154(b) by 162 days.

(21) Appl. No.: 13/820,977

(22) PCT Filed: Sep. 7, 2011

(86) PCT No.: PCT/EP2011/065488
§ 371 (c)(1),
(2), (4) Date: Apr. 9, 2013

(87) PCT Pub. No.: WO2012/032088
PCT Pub. Date: Mar. 15, 2012

(65) Prior Publication Data
US 2013/0189138 A1      Jul. 25, 2013

(30) Foreign Application Priority Data
Sep. 7, 2010 (FR) ..................................... 10 57096

(51) Int. Cl.
F16F 9/30     (2006.01)
F04B 1/00     (2006.01)
F16F 9/00     (2006.01)
F16F 9/06     (2006.01)

(52) U.S. Cl.
CPC . *F04B 1/00* (2013.01); *F16F 9/003* (2013.01); *F16F 9/065* (2013.01)
USPC .......................................... 188/298; 188/268

(58) Field of Classification Search
USPC ......................... 188/268, 297, 298; 267/64.17
See application file for complete search history.

(56) References Cited

U.S. PATENT DOCUMENTS

| | | | |
|---|---|---|---|
| 6,615,959 B2 * | 9/2003 | Eroshenko | 188/268 |
| 8,052,128 B2 * | 11/2011 | Kirchner et al. | 267/64.17 |
| 2012/0186923 A1 * | 7/2012 | Buma | 188/268 |

FOREIGN PATENT DOCUMENTS

| | | |
|---|---|---|
| EP | 1 250 539 A1 | 10/2002 |
| GB | 1 188 453 A | 4/1970 |

\* cited by examiner

*Primary Examiner* — Christopher Schwartz
(74) *Attorney, Agent, or Firm* — Muncy, Geissler, Olds & Lowe, P.C.

(57) ABSTRACT

A shock absorber has dissipation power and practically no oil. The shock absorber comprising a rod-and-piston assembly slidable in a tubular body. The rod-and-piston assembly co-operating with the tubular body to define two working chambers containing hydraulic fluid. Each working chamber being in permanent communication with an auxiliary chamber containing a heterogeneous energy absorption-dissipation structure with at least one porous capillary matrix and an associated liquid relative to which the matrix is lyophobic. The two auxiliary chambers are annular chambers formed in the wall of the tubular body on either side of central portion of the tubular body. Each of the annular auxiliary chambers houses a flexible bag containing the associated heterogeneous structure; and each of the two working chambers also communicates with an associated compensation chamber. The compensation chambers ensures hydraulic fluid continuity during movements of the rod-and-piston assembly in the tubular body.

17 Claims, 4 Drawing Sheets

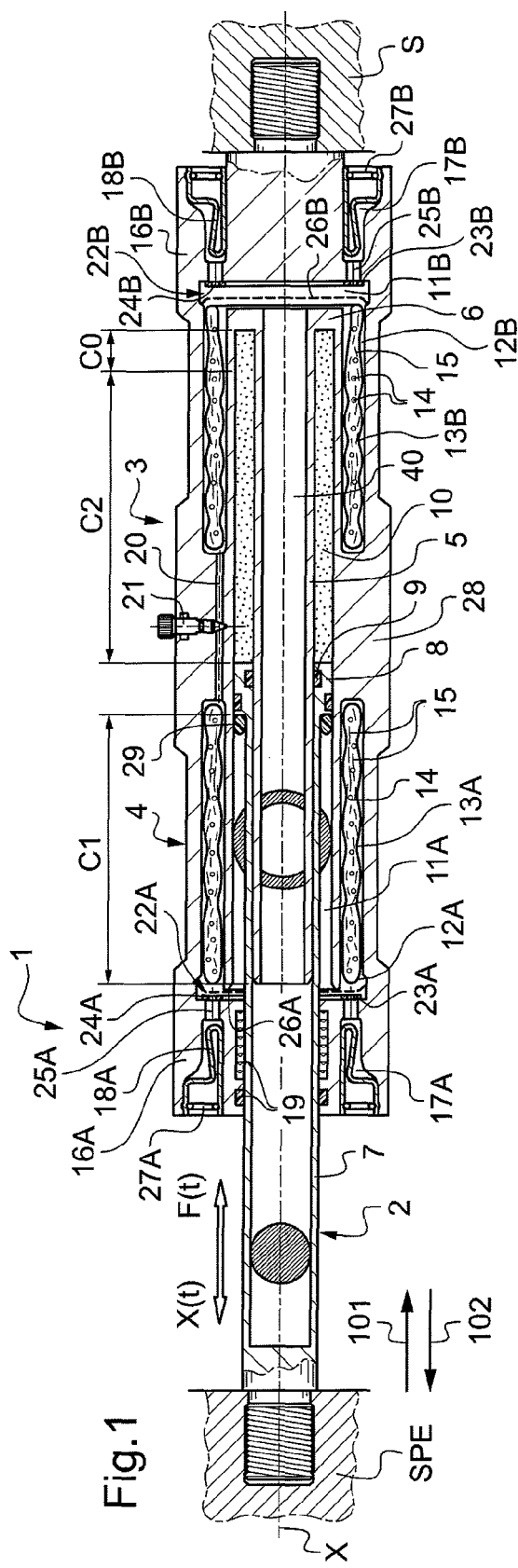
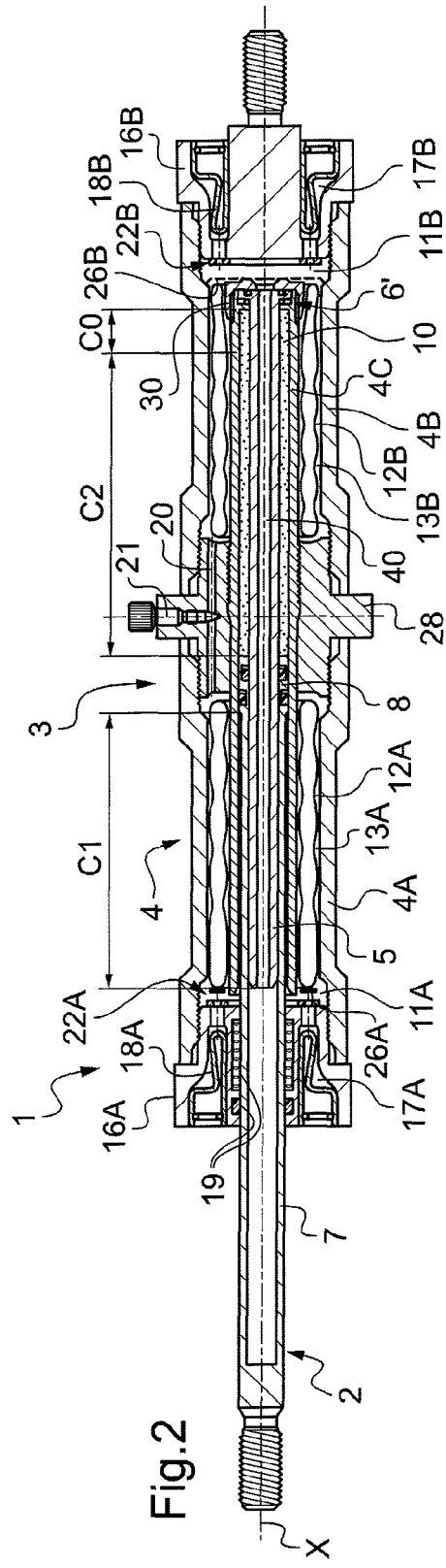
Fig.1
Fig.2

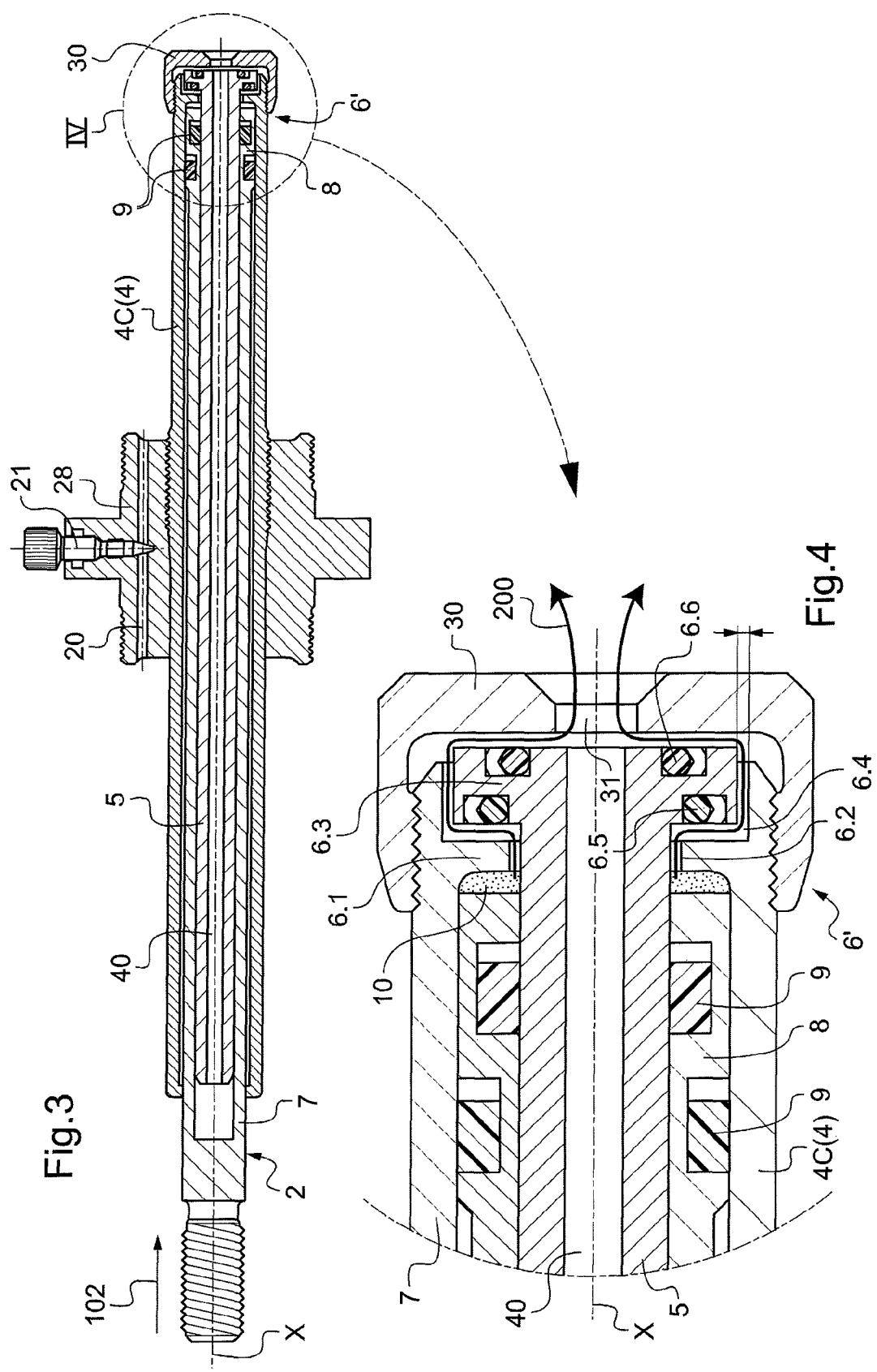

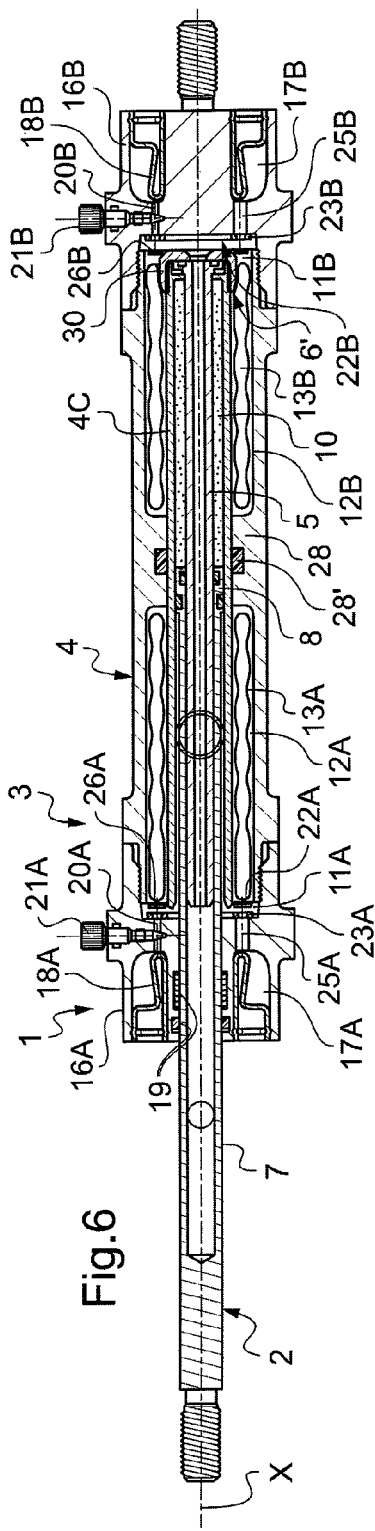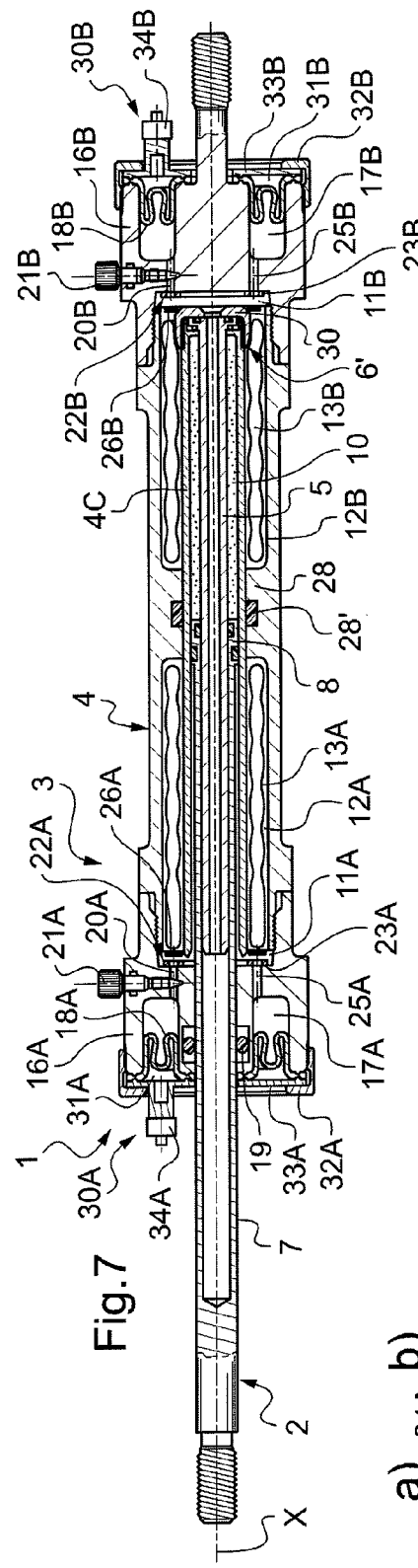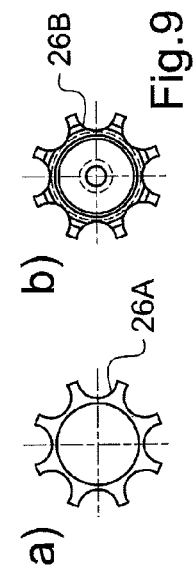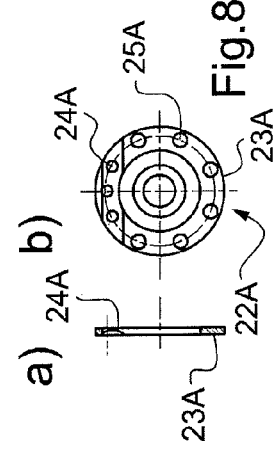

VIRTUALLY OIL-FREE SHOCK ABSORBER HAVING HIGH DISSIPATIVE CAPACITY

The present invention relates to a shock absorber with high dissipation power, and more particularly to a shock absorber of the type comprising a rod-and-piston assembly that is slidable in a tubular body, said rod-and-piston assembly being adapted to be connected to a source of external disturbances and said tubular body being adapted to be connected to a structure that is to be protected.

BACKGROUND OF THE INVENTION

In conventional hydraulic or oleo-pneumatic shock absorbers, use is made of a system comprising a rod-and-piston and a return spring, which system is interposed between the structure that is to be protected (e.g. the bodywork of a motor vehicle) and a source of external disturbances (e.g. a wheel of the vehicle in direct contact with the ground). A cylinder and rod-and-piston unit is then provided that is surrounded by the return spring and that has the function of dissipating the energy of impacts by making use of the viscous flow of a hydraulic fluid. Energy is dissipated in conventional shock absorbers of that type by the solid-liquid system transforming the mechanical energy of friction into heat, which is given off to the outside.

Such conventional shock absorbers are very widespread, but they remain tied to a principle of energy dissipation that is obtained solely by throttling a viscous fluid, generally oil, which explains the poor dissipation power of such shock absorbers. There also exist practical drawbacks that are inherent to their structure, in particular the fact of always being under high pressure. This applies for Monroe shock absorbers (oleo-pneumatic shock absorbers from the inventor Bourcier de Carbon) that make use of a free floating piston between the gas and the oil. Even when the shock absorber is in the rest state, there exists a permanent pressure lying in the range 50 bar to 100 bar that is there to prevent the oil vaporizing when it passes through calibrated throttling orifices. The presence of such a high pressure can give rise to danger during assembly and disassembly, and also while the shock absorber is being handled. In order to avoid that danger, it is conventional practice to provide a safety band that goes in front of the free end of the rod-and-piston so as to avoid any sudden extension of the rod that could give rise to a severe accident.

Another drawback, which is likewise inherent to the fact of being permanently under high pressure, is that for storage or transport of the shock absorber, the rod-and-piston is in the extended position, such that the shock absorber occupies a long length.

About ten years ago, proposals were made to devise a new type of shock absorber capable of obtaining much greater energy absorption-dissipation power, while being structurally lighter and less bulky than conventional shock absorbers. In this context, reference may be made to document EP 1 250 539 B1, which has the same inventor as the present application.

That new type of shock absorber uses a concept of a heterogeneous energy absorption-dissipation structure using a porous capillary matrix and an associated liquid relative to which said matrix is lyophobic, as described in detail in document EP 0 791 139 B1, which has the same inventor and is ten years older still. In accordance with that very innovative type of heterogeneous structure, a porous capillary solid matrix is used having pores that are open and of controlled shape, together with a liquid surrounding the porous capillary matrix so as to define a large specific separation surface area between the solid and the liquid, with the matrix being lyophobic relative to the liquid. The separation surface area then varies isothermally and reversibly as a function of the external pressure to which the heterogeneous structure is subjected.

The isothermal "compression-expansion" cycle of the heterogeneous structure is characterized by a closed loop presenting a large amount of hysteresis in the PV diagram, where hysteresis H corresponds to the difference $\Delta P = P_{int} - P_{exp}$, where $P_{int}$ is the pressure for forced intrusion of the liquid into the pore space of the matrix, and $P_{exp}$ is the pressure at which there is spontaneous expulsion of the liquid from said pore space, with the area defined by the closed loop characterizing the amount of energy that is dissipated. That fundamental principle is very innovative and is explained in detail in the publication that appears in the English journal J. Automobile Engineering, V. A. Eroshenko, 2007, Vol. 221, Part D, pp. 285-300 under the title "A new paradigm of mechanical energy dissipation—Part 1: theoretical aspects and practical solutions", and pp. 301 to 312 under the title "A new paradigm of mechanical energy dissipation—Part 2: experimental investigation and effectiveness of a novel car damper".

Document EP 1 250 539 B1 thus describes a shock absorber of the type comprising a rod-and-piston assembly slidable in a cylinder and defining on either side of the piston respective working chambers containing the hydraulic fluid, each working chamber communicating continuously with an associated chamber containing a heterogeneous energy absorption-dissipation structure, and also communicating with a common chamber via an associated system having a check valve and a constriction, the common chamber constituting a compensation chamber ensuring hydraulic fluid continuity during the movements of the rod-and-piston assembly in the cylinder. In this context, reference may be made to document EP 1 250 539 B1, which has the same inventor as the present application.

In that shock absorber, energy is dissipated without having recourse to the viscous fluid, e.g. oil, as soon as the travel speed of the piston exceeds a predetermined critical speed for switching from a conventional Newtonian regime to a surface-energy regime, making use of heterogeneous energy absorption-dissipation structures in which the "solid-liquid" interface acts as a working body.

Nevertheless, certain drawbacks have been found in the above-mentioned shock absorber structure.

Firstly, when the shock absorber uses a conventional two-chamber piston with two sealing systems, it is necessary to provide a body that extends towards the rear along a length that is sufficient to enable the rod-and-piston to penetrate completely, thereby giving rise to a shock absorber that is of considerable length, even when the rod-and-piston has penetrated completely.

Furthermore, the sole compensation chamber, which is arranged in the central portion of the shock absorber, is a chamber having a deformable wall defined by a flexible bag, and locating it in that position inevitably gives rise to a certain resistance to the transfer of heat between the working chambers and the outside.

Finally, the two flexible bags, each housing a respective heterogeneous energy absorption-dissipation structure constituted by at least one porous capillary matrix together with an associated liquid relative to which said matrix is lyophobic, are arranged in respective dedicated chambers of the two-chamber rod-and-piston. Consequently, those sealed bags are remote from the outside surface of the body of the shock absorber. Unfortunately, it is that surface which determines the effectiveness of heat exchange between the porous capillary matrices and the outside, and as a result a significant increase is observed in the temperature of said matrices in situations of severe operation and/or with high peak speeds of the rod-and-piston.

Document GB-A-1 188 453 discloses an oleo-pneumatic suspension having a tubular body defining a central chamber slidably receiving a piston and two annular chambers surrounding the central chamber. The central chamber is filled with oil and the piston is provided with channels allowing constrained passage of the oil from one side of the piston to the other. The annular chambers are separated by a deformable wall into two compartments, one containing oil and the other containing air. The oil-containing compartments are in communication with the central chamber via constrained passage channels, each on a respective side of the piston. It can be understood that the annular chambers provided with deformable walls separating oil and air perform a suspension function by compressing/relaxing the air in order to form a pneumatic spring.

OBJECT OF THE INVENTION

An object of the invention is to distinguish from the high dissipation power shock absorber of the above-mentioned type described in document EP 1 250 539 B1, in order to avoid the above-mentioned limitations and drawbacks, while also avoiding the drawbacks of conventional hydraulic and oleo-pneumatic shock absorbers, in particular concerning the high pressure and the large volume of oil used.

Another object of the invention is to design a shock absorber having high dissipation power and practically no oil that presents good behavior in the event of being heavily stressed and/or of the rod of the shock absorber moving at high speeds.

Another object of the invention is to design a shock absorber having high dissipation power and practically no oil, in which the structure makes it possible to avoid any risk or danger, during assembly, disassembly, and handling of the shock absorber, and also to achieve maximum compactness for transporting or storing the shock absorber.

GENERAL DEFINITION OF THE INVENTION

The above-mentioned technical problem is solved in accordance with the invention by means of a shock absorber of the type including a rod-and-piston assembly slidable in a tubular body with said rod-and-piston assembly co-operating with the tubular body to define two working chambers containing hydraulic fluid, each working chamber being in permanent communication with an auxiliary chamber containing a heterogeneous energy absorption-dissipation structure constituted by at least one porous capillary matrix and an associated liquid relative to which said matrix is lyophobic, the shock absorber being remarkable in that:
  the two auxiliary chambers are annular chambers formed in the wall of the tubular body on either side of central portion of said tubular body, each of said annular auxiliary chambers housing a flexible bag containing the associated heterogeneous structure; and
  each of the two working chambers also communicates via respective non-return means with an associated compensation chamber that is arranged in the corresponding end of the tubular body, said compensation chambers ensuring hydraulic fluid continuity during movements of the rod-and-piston assembly in the tubular body.
By means of the above-specified structure, the two flexible bags, each containing an associated heterogeneous structure, are close to the wall of the tubular body of the shock absorber, which is most advantageous for effective heat exchange between the porous capillary matrices and the outside. In addition, by providing two compensation chambers that are arranged at the two ends of the tubular body, it is possible to avoid any negative influence on heat exchange, and also to reduce the inertia (and thus increase the speed) with which hydraulic fluid is driven through the "working chamber and compensation chamber" system.

In accordance with an advantageous characteristic, the tubular body terminates at each of its two ends in a respective head that contains the associated compensation chamber, each compensation chamber being defined by a deformable flexible wall that is fastened and housed in the corresponding head. Each deformable flexible wall may be subjected externally to atmospheric pressure, or in a variant may be subjected externally to low positive pressure by associated pressurizing means incorporated in the corresponding head.

Under such circumstances, and advantageously, the non-return means associated with each compensation chamber are constituted by a check valve in the form of a washer having calibrated orifices and bearing against the corresponding head to mask connection channels formed in said head for connecting said compensation chamber to the associated working chamber.

In accordance with a particular embodiment, the tubular body includes a cylindrical portion and a hollow central rod portion, said portions forming between them an annular space in which the rod-and-piston assembly, which is likewise hollow, slides in leaktight manner, defining one of the two working chambers on the side of the piston that faces towards the source of external disturbances, and on the other side defining a closed annular chamber containing a gaseous fluid.

Provision may then be made for the closed annular chamber containing a gaseous fluid to have an end wall constituted by a ring securely connecting together the cylindrical portion and the hollow central rod portion, or in a variant for the annular chamber to have an end wall constituted by an annular shoulder projecting from the cylindrical portion, the hollow central rod portion passing slidably through the annular shoulder with clearance, said hollow central rod portion including an end flange that bears in leaktight manner against the above-mentioned annular shoulder during operation of the shock absorber, and that is capable of being separated from said shoulder in order to constitute a vent enabling the rod-and-piston assembly to penetrate maximally into the tubular body in order to minimize the overall size of the shock absorber for storage or transport thereof. Under such circumstances, and advantageously, the free end of the cylindrical portion has an outside thread in order to receive a nut for clamping the end flange of the hollow central rod portion against the shoulder of the cylindrical portion, or for separating said flange from said shoulder, said nut presenting a central orifice for passing the hydraulic fluid during operation of the shock absorber.

In a variant, provision may be made for the cylindrical portion of the tubular body to be constituted by two tubes, each having one end screwed to a threaded fitting constituting the central portion, and each having its other end screwed to a threaded head containing the associated compensation chamber, and by a sheath portion that is constituted by one or two tubes screwed into a bore of the central fitting. In particular, that one of the two heads having the rod-and-piston assembly passing therethrough is fitted with the sole sealing system for sealing the shock absorber relative to the outside.

Also advantageously, an annular grid is provided in the opening of each of the annular auxiliary chambers, the grid serving to position and hold the flexible bag that is housed in the corresponding annular auxiliary chamber. In particular, each of the above-mentioned annular grids is in the form of a star that is hollowed out in its central portion.

In accordance with another particular embodiment, the two annular auxiliary chambers communicate with each other via a channel formed in the central portion of the tubular body, said channel being fitted with a common constriction. The hydraulic resistance provided by the non-return means is then always greater in the closed position than the adjustable hydraulic resistance provided by the common constriction.

In accordance with a variant embodiment, the two annular auxiliary chambers do not communicate with each other, but each of said annular auxiliary chambers communicates with the associated compensation chamber via a respective channel formed in the corresponding end of the annular body, each channel being fitted with its own constriction. The hydraulic resistance provided by the non-return means is then always greater, in the closed position, than the adjustable hydraulic resistance provided by each constriction.

Other characteristics and advantages of the invention appear more clearly in the light of the following description and the accompanying drawings relating to a particular embodiment.

BRIEF DESCRIPTION OF THE DRAWINGS

Reference is made to the figures of the accompanying drawings, in which:

FIG. 1 is an axial section view of a shock absorber in accordance with the invention;

FIG. 2 is an axial section view of a variant of the FIG. 1 shock absorber in which a vent arrangement is provided that is designed to enable the rod-and-piston assembly to penetrate maximally into the inside of the tubular body, and also to retain said assembly in this position;

FIG. 3 is an axial section view showing the central portion of the FIG. 2 shock absorber in the maximally contracted position of the rod-and-piston, with suction being formed while the shock absorber is in use;

FIG. 4, on a much larger scale, shows a detail IV of FIG. 3 in which the above-mentioned vent-forming arrangement can be seen more clearly in the open position (the position shown), which arrangement serves to form suction in the closed position (with the nut tightened);

FIG. 6 is an axial section view of yet another variant of the shock absorber, in which each annular auxiliary chamber communicates with the associated compensation chamber via a channel fitted with its own constriction;

FIG. 7 is an axial section view of a variant of the FIG. 6 shock absorber, in which the deformable flexible wall defining each compensation chamber is subjected externally to a small positive pressure, unlike the above-mentioned variant in which it is subjected to atmospheric pressure;

FIG. 8 shows one of the non-return means of the shock absorber of FIGS. 6 and 7; and FIG. 9 shows the star-shaped grids used for positioning and holding the flexible bags of the shock absorber of FIGS. 6 and 7.

DETAILED DESCRIPTION OF THE PREFERRED EMBODIMENT

Figure 5:
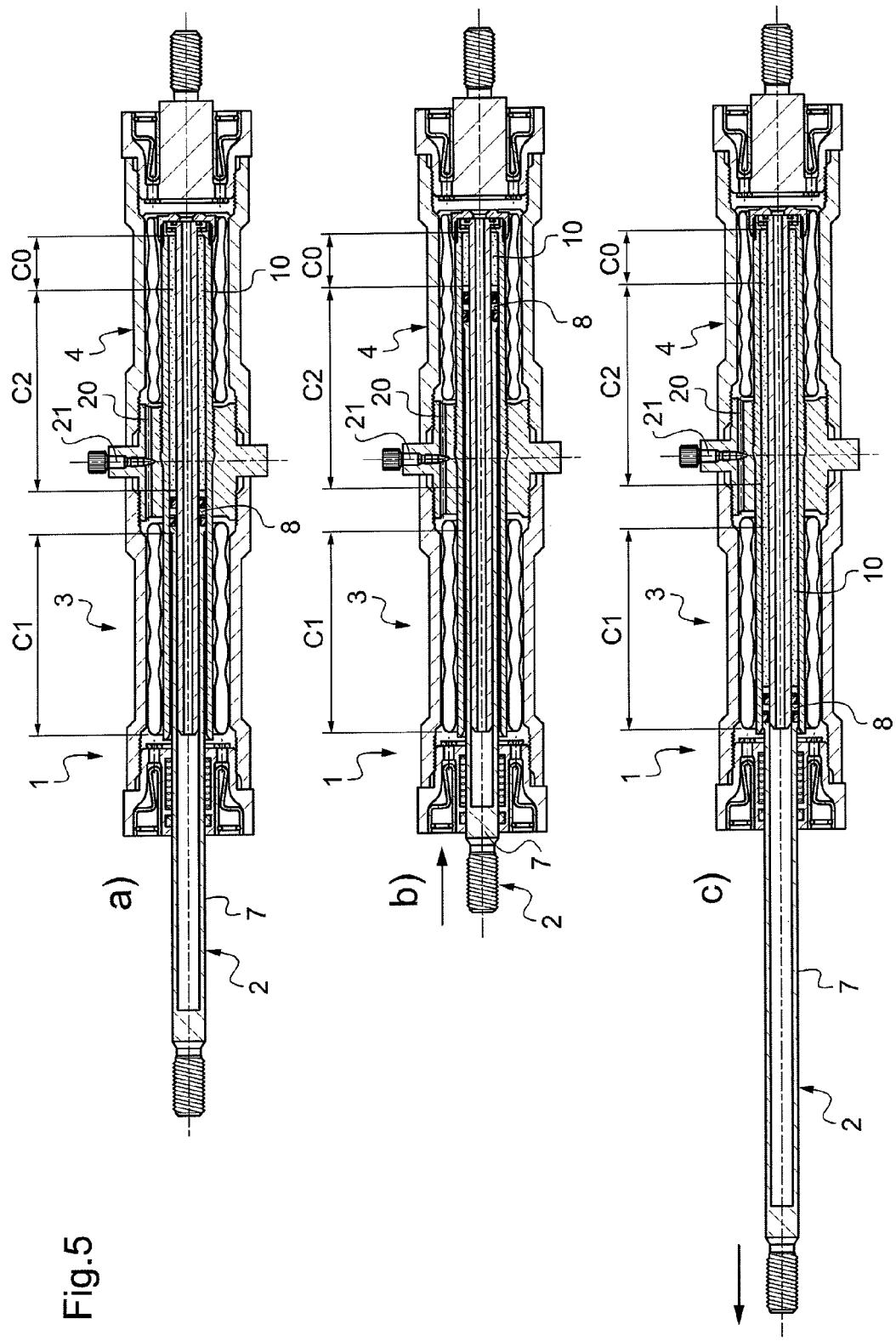
FIG. 5 shows the shock absorber of FIGS. 2 to 4 in various axial positions of its rod-and-piston assembly, with a) showing a middle position, b) showing a maximum penetration position of the rod-and-piston assembly achieved as a result of opening the vent, and c) showing a maximally-extended position of the rod-and-piston assembly.

FIG. 1 shows a shock absorber referenced 1 in accordance with the invention, the shock absorber having high dissipation power and practically no oil. This shock absorber is of the type comprising a rod-and-piston assembly 2 that is slidable in a tubular body 3, said rod-and-piston assembly being adapted to be connected to an external source of disturbances referenced SPE (e.g. a wheel of a vehicle fitted with the shock absorber in its suspension, for a wheel that is in direct contact with the ground), and said tubular body is adapted to be connected to a structure that is to be protected, referenced S (e.g. the bodywork of the motor vehicle fitted therewith).

Specifically, the tubular body 3 has a cylindrical portion 4 within which an open-ended hollow central rod portion 5 extends axially, along a longitudinal axis X of the shock absorber. The ring 6 securely connecting the cylindrical portion 4 to the hollow central rod portion 5 thus forms the end wall of a chamber 10 that is a closed annular chamber containing a gaseous fluid, e.g. air or nitrogen.

Nevertheless, it should be observed that such a rigid closed end wall constitutes only one particular embodiment and, as described below, it is possible to provide an end wall that is not a unitary single piece, in order to provide a vent function for the purpose of making it possible both to enable the rod-and-piston assembly to penetrate maximally into the inside of the tubular body 3 in order to minimize the overall size of the shock absorber during storage or transport thereof, and also to form suction that is created while the shock absorber is in use.

The rod-and-piston assembly is thus constituted by a rod proper 7 and by a piston 8 that slides, with sealing provided by means of gaskets 9, in the annular space defined between the inner wall of the cylindrical portion 4 and the outer wall of the hollow central rod portion 5. The cylindrical portion 4 and the hollow central rod portion 5 form between them an annular space in which the rod-and-piston assembly, which is likewise hollow, slides in sealed manner, defining a "working" chamber 11A on the side of the piston 8 that faces towards the source of external disturbances SPE, and on the other side it defines the closed annular chamber 10 containing a gaseous fluid.

In accordance with the general principle of the shock absorber having high dissipation power as described in above-mentioned document EP 1 250 539 B1, the rod-and-piston assembly 2 co-operates with the tubular body 3 to define two working chambers 11A and 11B containing hydraulic fluid, each working chamber 11A, 11B being in permanent communication with an auxiliary chamber 12A, 12B containing a heterogeneous energy absorption-dissipation structure constituted by at least one porous capillary matrix 14 and an associated liquid 15 relative to which said matrix is lyophobic. Nevertheless, unlike the above-mentioned shock absorber, the inside section of the rod-and-piston 2 in this example acts as the piston for the working chamber 11B.

In accordance with a first characteristic of the invention, the two auxiliary chambers 12A and 12B are annular chambers placed in the wall of the tubular body 3 on either side of a central portion 28 of said tubular body. Each of these annular auxiliary chambers 12A, 12B houses a flexible bag 13A, 13B containing the associated heterogeneous structure for which the porous capillary matrixes are represented herein by solids 14, the associated liquid relative to which said matrices are lyophobic being given reference 15. The liquid may be water or any other suitable liquid.

It can immediately be observed that each of the flexible bags 13A, 13B containing an associated heterogeneous structure 14, 15 is arranged in the vicinity of the outer wall of the tubular body of the shock absorber, which is very favorable in terms of heat exchange with the outside.

The two annular auxiliary chambers 12A, 12B in this example communicate with each other via a channel 20 formed in the central portion 28 of the tubular body and extending parallel to the axis X, which channel 20 is provided with a common constriction 21 that provides adjustable hydraulic resistance.

In accordance with another characteristic of the invention, each of the two working chambers 11A and 11B defined by the rod-and-piston assembly 2 in association with the tubular body also communicates, via respective non-return means 22A and 22B with an associated compensation chamber 17A, 17B that is arranged in the end of the tubular body 3. Specifically, the tubular body 3 is terminated at each of its two ends by a respective head 16A, 16B containing the associated compensation chamber 17A, 17B, each compensation chamber being defined by a deformable flexible wall 18A, 18B that is fastened and housed in the corresponding head 16A, 16B, said deformable flexible wall 18A, 18B being specifically subjected externally to atmospheric pressure. References 27A, 27B designate elements such as clips that enable the deformable flexible wall 18A, 18B to be fastened in the associated housing of the corresponding head 16A, 16B. In a variant, and as shown in FIG. 7, it is possible to provide for each deformable flexible wall 18A, 18B to be subjected externally to a small amount of positive pressure by associated pressurizing means 30A, 30B incorporated in the head in question 16A, 16B.

As can be seen from the description below of how the shock absorber operates, the two compensation chambers 17A and 17B are for providing hydraulic fluid continuity during movement of the rod-and-piston assembly 2 in the tubular body 3. Once more, it should be observed that the single and central compensation chamber of the shock absorber of above-mentioned document EP 1 250 539 B1 is replaced in this example by two compensation chambers arranged at the two ends of the tubular body, such that, as a result, their presence has no influence on heat exchange during the operation of the shock absorber.

As shown herein, it is also advantageous to provide annular grids 26A, 26B, each in the form of a hollow star or a ring (analogous to the grids shown in FIG. 9), which grids are arranged in the openings of each of the auxiliary annular chambers 12A, 12B, each grid serving to position and hold the flexible bag 13A, 13B that is housed in the annular auxiliary chamber in question. This ensures there is no risk of the flexible bag 13A, 13B being damaged while the shock absorber is in operation, in particular in the event of high levels of vibration.

The flexible bags 13A, 13B are made of a material that cannot be penetrated by the hydraulic fluid, as already described in the context of the shock absorber having high dissipation power of above-mentioned document EP 1 250 439 B1. Each flexible bag thus contains the porous capillary matrices 14 that are immersed in an associated functional liquid 15 (working liquid), which may for example be water. The other chambers of the shock absorber, naturally outside the above-mentioned annular chamber 10 that contains a gas, are then occupied by a hydraulic fluid such as oil (technological liquid).

As can be seen in FIG. 1, the tubular body 3 is terminated at each of its two ends by a head 16A, 16B, in this example forming a single piece with the remainder of the cylindrical portion 4, which head contains the associated compensation chamber 17A, 17B.

The non-return means 22A, 22B associated with each compensation chamber 17A, 17B are constituted specifically by check valves in the form of washers 23A, 23B having calibrated orifices 24A, 24B and bearing against the corresponding head 16A, 16B in order to mask connection channels 25A, 25B formed in said head and connecting each compensation chamber 17A, 17B to the associated working chamber 11A, 11B. The calibrated orifices 24A, 24B of each washer 23A, 23B constituting the non-return means 22A, 22B are therefore dimensioned so that the hydraulic resistance they procure is always greater in the closed position than the adjustable hydraulic resistance procured by the common constriction 21. By adjusting the hydraulic resistance of the constriction means 21, it is possible to adjust the intrusion pressure for enabling the functional liquid to intrude into the pore space of the porous capillary matrix (in the surface energy dissipation regime). This phenomenon of effective dissipation of mechanical energy is explained by the high difference $\Delta P$ between the pressure $P_{int}$ for forced intrusion of the liquid into the pore space of the matrix and the pressure $P_{exp}$ for spontaneous expulsion of the liquid from the pore space ($\Delta P = P_{int} - P_{exp}$ with $P_{int} \gg P_{exp}$). This can be better understood by referring to the description given below of the operation of the shock absorber. For still greater detail, reference may also be made to the above-mentioned 2007 publication.

It should be observed that that one of the two heads 16A that has the rod-and-piston assembly 2 passing therethrough is provided with the sole sealing system 19 of the shock absorber for dealing relative to the outside, which constitutes a major advantage over prior embodiments of the prior art that require the shock absorber to have two sealing systems for sealing relative to the outside.

Finally, it should be observed in FIG. 1 that there is a flexible O-ring 29 arranged against the piston 8 on the rod 7 of the rod-and-piston assembly 2, for the purpose of constituting a safety stop in the maximally-extended position of the rod-and-piston assembly 2.

In FIG. 1, arrows 101 and 102 respectively symbolize the extension and penetration directions of the rod-and-piston assembly 2.

In FIG. 1, the shock absorber is shown with its rod-and-piston assembly in a middle position, such that the available extension stroke, referenced C1, is substantially identical to the available penetration stroke, referenced C2. The residual stroke, referenced C0, corresponds to the piston penetrating maximally, with the volume of gas contained in the annular chamber 10 being compressed maximally, without allowing the gas to escape. In the variant of the figures that are described below, it can be seen that it is possible in certain circumstances to eliminate this residual stroke C0 in order to achieve total penetration of the rod-and-piston assembly so as to maximize the compactness of the shock absorber.

FIGS. 2 to 4 show a variant of the shock absorber as described above with reference to FIG. 1, this variant presenting a structure in which fabrication and assembly are greatly simplified, as can be seen from the explanations given below.

The cylindrical portion 4 of the tubular body 3 is then constituted by two tubes 4A and 4B, each of which is screwed at one end to a threaded fitting constituting the central portion 28, and that is screwed at its other end to a respective threaded head 16A, 16B containing the associated compensation chamber 17A, 17B. The tubular body 3 is also constituted by a sheath portion referenced 4C that is constituted by one or two tubes (one in this example) that is/are specifically screwed into a bore of the central fitting 28. Thus, the single-piece component constituting the cylindrical portion 4 of the tubular body for the FIG. 1 shock absorber is replaced by two tubes 4A, 4B, two heads 16A, 16B, a central fitting 28, and, in this example, a single sheath-forming tube 4C. As mentioned above, the central fitting 28, which is threaded at both ends, presents the channel 20 providing communication between the two tubular auxiliary chambers 12A and 12B, and it is fitted with the associated common constriction 21.

As can be seen better in FIG. 3, and above all in the detail shown in FIG. 4, it can be seen that the closed annular chamber 10 containing a gaseous fluid has an end wall 6' that is constituted in this example by an annular shoulder 6.1 forming part of the sheath portion 4C of the cylindrical portion 4 of the tubular body 3. This annular shoulder 6.1 has the hollow central rod portion 5 passing slidably therethrough with clearance (clearance 6.2), said hollow central rod 5 having an end flange 6.3 carrying a respective sealing gasket 6.5 or 6.6 on each of its circular faces. The free end of the sheath portion 4C of the cylindrical portion 4 has an outside thread in order to receive a nut 30 for clamping the end flange 6.3 of the hollow central rod portion 5 against the shoulder 6.1 of the sheath portion 4C, or for disengaging said flange 6.3 from said shoulder 6.1. Thus, the end flange 6.3 can be clamped to bear in leaktight manner against the shoulder 6.1, which corresponds to the operating position of the shock absorber, but it can also be disengaged therefrom (the position shown in FIG. 4) so as to constitute a vent enabling the rod-and-piston assembly 2 to penetrate maximally into the inside of the tubular body 3 in order to minimize the overall size of the shock absorber for storage or transport thereof. This maximum penetration position of the rod-and-piston is the position shown in FIGS. 3 and 4, and it can be seen that the gas contained in the annular chamber 10 can then escape, since the nut 30 is slightly loosened via the above-mentioned through clearance 6.2 and the through clearance referenced 6.4 that is defined by the periphery of the flange 6.3 so as to escape via a central orifice 31 of the nut 30, as represented by arrows 200 in FIG. 4. The shock absorber is then ultra-compact. Once this position has been reached, it suffices for the operator to tighten the nut 30 once more so as to re-seal the end wall 6'. It can thus be understood that this maximum penetration position of the rod-and-piston is maintained (the nut 30 being tightened once more) by the suction that is created in the chamber 10 as soon as said rod-and-piston leaves this position (this suction constituting effective return means that are both simple and reliable).

When the shock absorber needs to be reassembled or installed starting from this maximum penetration position of the rod, the operator can easily pull on the rod to bring it into a middle position while the nut 30 is still tight, thereby forming a small amount of suction in the chamber 10 that was initially at atmospheric pressure. In operation, the central orifice 31 of the nut 30 extends the central channel referenced 40 of the central rod portion 5 so as to allow the fluid to pass during movements of the rod-and-piston.

When it is desired to store or transport the shock absorber, the nut 30 is loosened, and the rod-and-piston can be pushed in to the maximum in order to have a shock absorber that is ultra-compact for storage or transport. The pressure in the chamber 10 then remains equal to atmospheric pressure, thereby excluding any danger during handling of the shock absorber.

In FIG. 5, a) shows the state of the above-described shock absorber with the rod-and-piston in its middle position (a small amount of suction that exists in the chamber 10), b) shows said rod-and-piston in its maximum penetration position over the entire stroke C2, with the residual stroke C0 that is maintained insofar as the shock absorber is in the operating state (the pressure in the chamber 10 is then equal to atmospheric pressure), and finally c) shows the maximally-extended position of the rod-and-piston over the entire stroke C1 (with suction greater than in a) then existing in the chamber 10).

There follows a description of the operation of the above-described shock absorber when mounted on a motor vehicle (not shown).

In the static state, the piston 9 of the rod-and-piston assembly 2 occupies a neutral position (the movement of the rod 7, written $\Delta X(t)$ in FIG. 1, is zero) such as the position shown in FIGS. 1, 2, and 5a), with this resulting from the equilibrium between the weight of the motor vehicle and the force of the return spring of the suspension (not shown). The hydraulic pressures in the working chambers 11A and 11B, and also in the inside volume of the central channel 40 are then the same throughout, and they are equal to atmospheric pressure because of the presence of the calibrated orifices 24A, 24B in the check valves 23A, 23B, and also in this example because of the through channel 20 having the constriction 21. The porous capillary matrices 14 contained in the flexible bags 13A, 13B and immersed in the functional liquid 15 have inside spaces that are then empty. It can easily be understood that a small positive pressure in the annular chamber containing the gas 10 has no influence on the value of the pressure that exists in the hydraulic pool of the shock absorber, nor on the behavior of the heterogeneous structures 14, 15 contained in the two flexible bags 13A, 13B.

In dynamic operation of the shock absorber, it is appropriate to distinguish between two operating regimes, comprising a first regime that is said to be "Newtonian" that is the same as the only operating regime of conventional hydraulic or oleo-pneumatic shock absorbers, and another regime, referred to as a "surface-energy" regime, that makes use of the heterogeneous energy absorption-dissipation structures, as described in document EP 1 250 539 B1 and in the above-mentioned 2007 publication.

The Newtonian regime corresponds to mechanical energy dissipation and it is the regime that is commonly to be found in conventional hydraulic or oleo-pneumatic shock absorbers, with the viscous liquid being throttled through calibrated orifices so as to transform friction energy into heat, with the heat being given off to the outside. The movement $\Delta X(t)$ of the rod 7 with a force F(t) (as shown in FIG. 1) gives rise to variation in the hydraulic pressures in the working chambers 11A, 11B, with that resulting in the liquid being driven along the channel 20. For example, if it assumed that the rod-and-piston assembly 2 moves in the direction of arrow 102, then the hydraulic pressure in the central channel 40, and consequently in the working chamber 11B, increases, while the hydraulic pressure in the other working chamber 11A decreases. The check valve 23B remains closed and the (adjustable) resistance of the constriction 21 then allows the liquid to pass smoothly from the working chamber 11B and the associated annular auxiliary chamber 12B to the working chamber 11A and to the associated annular auxiliary chamber 12A. The liquid then progressively fills the annular space adjacent to the piston 8, and in the event of insufficient volume, the check valve 23A opens under atmospheric pressure and the necessary quantity of liquid contained in the compensation chamber 17A penetrates into the working chamber 11A in order to ensure continuity of the fluid in the hydraulic pool of the shock absorber. In this Newtonian regime, ordinary fluid delivery between the working chambers and their respective auxiliary annular chambers via the channel 20, as controlled by the constriction 21, provides the mechanical energy dissipation function. If the rod moves in the direction of arrow 101, exactly the same operation takes place symmetrically, with the letters A and B being interchanged.

In all of the circumstances considered above, the pressure inside the annular auxiliary chambers 12A, 12B housing the flexible bag 13A, 13B remains moderate, and in any event insufficient for causing the functional liquid to enter into the pore space in the matrices of the heterogeneous structure, insofar as said pressure is less than the Laplace capillary pressure that corresponds to the pressure $P_{int}$ for causing the functional liquid to intrude into the pore space (of volume $V_{pores}$). Thus, in the context of operation in the Newtonian regime, the volume of the flexible bags 13A, 13B remains practically constant, which means that the heterogeneous structures 14, 15 do not contribute to dissipating energy during the Newtonian regime.

If the travel speed $\dot{X}$ of the rod-and-piston assembly 2 exceeds a critical value $\dot{X}_{cr}$, e.g. a value of the order of 0.1 for private cars, then the hydraulic resistance provided by the constriction 21 increases considerably, and gives rise to a large pressure increase in one of the annular auxiliary chambers 12A or 12B until reaching the limit value for the Laplace capillary pressure. Under such circumstances, the fast movement of the rod-and-piston assembly 2 causes the functional liquid to intrude into the inside spaces of the matrices of the heterogeneous structure in one of the flexible bags (the bag in which the pressure increases), such that the volume of the bag in question decreases considerably, and more precisely by the value $V_{pores}$. Because of the communication between the annular auxiliary chambers 12A and 12B via the channel 20, the inverse phenomenon occurs for the heterogeneous structure situated in the other annular auxiliary chamber, thereby producing the principle of a high-hysteresis compression-expansion cycle that is characterized by a very large value for energy dissipation, in compliance with the relationship:

$$E = (P_{int} - P_{exp}) \cdot V_{pores}.$$

Thus, during the movement of the rod-and-piston assembly 2 in the direction of arrow 102, the volume of technological liquid (oil) expelled from the central channel 40 under high pressure cannot be delivered via the constriction 21 into the annular auxiliary chamber 12A because of the high resistance of the constriction. As a result, the expelled volume is constrained to compress the corresponding flexible bag 13B, and the volume decrease $\Delta V$ of this bag is equal to a value that is equivalent to the filled pore volume $V_{pores}$ of the matrix or matrices contained inside the flexible bag 13B. The pressure exerted in the annular auxiliary chamber 12B then exceeds the value of the Laplace capillary pressure (intrusion pressure $P_{int}$), thereby forcing the functional liquid to intrude into the porous matrix or matrices in question. On the other side of the piston 8, the volume of the space increases, and the pressure therein decreases. The suction in the other annular auxiliary chamber 12A then causes the associated heterogeneous structure to expand with spontaneous expulsion of the functional liquid at the pressure $P_{exp}$ (where $P_{exp} \ll P_{int}$) out from the pores in the porous matrices located in the flexible bag 13A, possibly together with the check valve 23A opening simultaneously, so as to provide additional liquid filling using liquid coming from the compensation chamber 17A under the drive of atmospheric pressure. Because of the simultaneous nature of the compression-expansion processes in the two annular auxiliary chambers 12B, 12A, the cycle that is performed gives rise to a large quantity of mechanical energy being dissipated, where this quantity is directly proportional to the pressure difference $\Delta P = P_{int} - P_{exp}$ which determines the large quantity of energy that is dissipated $$E = (P_{int} - P_{exp}) \cdot V_{pores}.$$

During a movement of the rod-and-piston assembly 2 in the opposite direction 101, the piston 8 then expels the liquid from the working chamber 11A and the associated annular auxiliary chamber 12A, thereby producing compression in the flexible bag 13A and forced intrusion of the functional liquid into the pore space of the matrix of the associated heterogeneous structure 14, 15. During this movement, suction is produced in the other annular auxiliary chamber 12B, thereby initiating spontaneous expulsion of the functional liquid 15 from the pores of the porous matrix 14 of the heterogeneous structure housed in the flexible bag 13B. The opening of the check valve 23B once more guarantees fluid continuity in the annular auxiliary chamber 12B, possibly because of the arrival of additional technological liquid from the associated compensation chamber 17B.

There follows a description of two other variants of the above-described shock absorber, with reference to FIGS. 6 and 7.

Once more there is a sheath portion 4C with its end wall 6' fitted with a nut 30 associated with a vent-forming system. However, the sheath portion 4C is either inserted as a force-fit in the central portion 28 of the body portion that is made as a single piece 4 (FIG. 6 variant), or else, as described above, that is screwed into a bore of the central portion 28 of the body portion that is made as a single piece 4 (variant of FIG. 7), with a central gasket 28' providing sealing.

Unlike the above-described variants, the two annular auxiliary chambers 12A and 12B no longer communicate with each other, but each of these chambers communicates with the associated compensation chamber 17A, 17B via a respective channel 20A, 20B formed in the corresponding head 16A, 16B of the tubular body, each channel 20A, 20B also being fitted with its own constriction 21A, 21B.

The non-return means 22A, 22B are then slightly modified, as shown in FIG. 8, in which there can be seen a check valve 23A in profile view (at a)) and in face view (at b)). The hydraulic resistance provided by the non-return means 22A, 22B in the closed position needs once more to be greater than the adjustable hydraulic resistance provided by each of the constrictions 21A, 21B.

FIG. 9 shows in isolation the positioning and holding grids for the flexible bags 13A, 13B that contain the heterogeneous structures of the shock absorber. Specifically, for a shock absorber having the internal vent arrangement so as to be capable of being ultra-compact, there can be seen in a), the grid 26A that is normally engaged on the free end of the hollow central rod portion 5, and in b), the grid 26B that is normally engaged on the nut 30, both of these grids 26A and 26B being in the form of a star with a circular hollow in its central portion.

As shown in FIG. 7, it is also possible to modify the structure of the variant of FIG. 6 by providing for the flexible wall 18B of the compensation chamber 17B (which is beside the structure to be protected) to be subjected externally, not to atmospheric pressure as described above, but instead to a small amount of positive pressure (e.g. 0.5 bar to 1.0 bar) as generated by a mechanical or pneumatic spring, and to do the same for the other flexible wall 18A using a slightly greater pressure (e.g. in the range 0.5 bar to 1 bar), thereby better guaranteeing fluid continuity and speed of response. It is important to observe that in the rest state of the shock absorber, there is no pressure other than the above-mentioned small positive pressures, lying in the range 0.5 bar to 1.0 bar, thereby completely avoiding the drawbacks and dangers mentioned in the introduction associated with high pressure oleo-pneumatic shock absorbers that make use of positive pressures lying in the range 50 bar to 100 bar.

Thus, FIG. 7 shows pressurizing means 30A, 30B that are incorporated in the corresponding head 16A, 16B and that provide the desired small positive pressure. Specifically, there can be seen a pressurizing chamber 31A, 31B that is closed by a cover 32A, 32B and that holds a plate 33A, 33B fitted with a coupling piece 34A, 34B for use in filling the corresponding pressurizing chamber with an appropriate fluid.

These two variants of FIGS. 6 and 7 are particularly advantageous for a shock absorber that operates in a position that is essentially vertical, since they avoid liquid being delivered from one compensation chamber to the other under the effect of gravity (where such delivery can occur in the variants of FIGS. 1 to 5).

Furthermore, having two separate constrictions 21A and 21B enables fine adjustment to be performed so as to guarantee that the asymmetry of the characteristic of the shock absorber is constant, with this adjustment being made once and for all on initial assembly of the shock absorber. To perform this adjustment, it is always ensured that the return force of the shock absorber is set to a value that is higher than the impact force.

The above-described structures provide numerous advantages over the prior art shock absorber of high dissipation power, as described above in detail.

The invention is not limited to the embodiments that are described, but on the contrary covers any variant using equivalent means to reproduce the above-specified essential characteristics.

In particular, the invention may be applied to fields other than motor vehicle suspensions, for example to anti-seismic systems, to supports for gas, oil, or steam pipes, or to supports for public building works, and also to anti-vibration skids, with the above-mentioned advantages of greater effectiveness associated with high dissipation power and great compactness of the dissipation devices and systems.

The rod-and-piston assembly 2 may be adapted to be connected to the source of external disturbances SPE or to the structure that is to be protected S, and the tubular body may be adapted to be connected to the structure that is to be protected S or to the source of external disturbances SPE.

The invention claimed is:

1. A shock absorber of the type including a rod-and-piston assembly slidable in a tubular body with said rod-and-piston assembly co-operating with the tubular body to define two working chambers containing a hydraulic fluid, each working chamber being in permanent communication with an auxiliary chamber containing a heterogeneous energy absorption-dissipation structure constituted by at least one porous capillary matrix and an associated liquid relative to which said matrix is lyophobic, the shock absorber being characterized in that:
the two auxiliary chambers are annular chambers formed in the wall of the tubular body on either side of a central portion of said tubular body, each of said annular auxiliary chambers housing a flexible bag containing the associated heterogeneous structure; and
each of the two working chambers also communicates via respective non-return means with an associated compensation chamber that is arranged in the corresponding end of the tubular body, said compensation chambers ensuring hydraulic fluid continuity during movements of the rod-and-piston assembly in the tubular body.

2. The shock absorber according to claim 1, wherein the tubular body terminates at each of its two ends in a respective head that contains the associated compensation chamber, each compensation chamber being defined by a deformable flexible wall that is fastened and housed in the corresponding head.

3. The shock absorber according to claim 2, wherein each deformable flexible wall is subjected externally to atmospheric pressure.

4. The shock absorber according to claim 2, wherein each deformable flexible wall is subjected externally to low positive pressure by associated pressurizing means incorporated in the corresponding head.

5. The shock absorber according to claim 2, characterized in that wherein the non-return means associated with each compensation chamber are constituted by a check valve in the form of a washer having calibrated orifices and bearing against the corresponding head to mask connection channels formed in said head for connecting said compensation chamber to the associated working chamber.

6. The shock absorber according to claim 1, wherein the tubular body includes a cylindrical portion and a hollow central rod portion, said portions forming between them an annular space in which the rod-and-piston assembly, which is likewise hollow, slides in leaktight manner, defining one of the two working chambers on the side of the piston that faces towards the source of external disturbances (SPE), and on the other side defining a closed annular chamber containing a gaseous fluid.

7. The shock absorber according to claim 6, wherein the closed annular chamber containing a gaseous fluid has an end wall constituted by a ring securely connecting together the cylindrical portion and the hollow central rod portion.

8. The shock absorber according to claim 6, wherein the closed annular chamber containing a gaseous fluid has an end wall constituted by an annular shoulder projecting from the cylindrical portion, the hollow central rod portion passing slidably through the annular shoulder with clearance, said hollow central rod portion including an end flange that bears in leaktight manner against the above-mentioned annular shoulder during operation of the shock absorber, and that is capable of being separated from said shoulder in order to constitute a vent enabling the rod-and-piston assembly to penetrate maximally into the tubular body in order to minimize the overall size of the shock absorber for storage or transport thereof.

9. The shock absorber according to claim 8, characterized in that the free end of the cylindrical portion has an outside thread in order to receive a nut for clamping the end flange of the hollow central rod portion against the shoulder of the cylindrical portion, or for separating said flange from said shoulder, said nut presenting a central orifice for passing the hydraulic fluid during operation of the shock absorber.

10. The shock absorber according to claim 6, wherein the cylindrical portion of the tubular body is constituted by two tubes, each having one end screwed to a threaded fitting constituting the central portion, and each having its other end screwed to a threaded head containing the associated compensation chamber, and by a sheath portion that is constituted by one or two tubes screwed into a bore of the central fitting.

11. The shock absorber according to claim 1, wherein one of the two heads having the rod-and-piston assembly passing therethrough is fitted with the sole sealing system for sealing the shock absorber relative to the outside.

12. The shock absorber according to claim 1, characterized in that it is provided with an annular grid in the opening of each of the annular auxiliary chambers, the grid serving to position and hold the flexible bag that is housed in the corresponding annular auxiliary chamber.

13. The shock absorber according to claim 12, wherein each of the annular grids is in the form of a star that is circularly hollowed out in its central portion.

14. The shock absorber according to claim 1, wherein the two annular auxiliary chambers communicate with each other via a channel formed in the central portion of the tubular body, said channel being fitted with a common constriction.

15. The shock absorber according to claim 14, wherein the hydraulic resistance provided by the non-return means is always greater in the closed position than the adjustable hydraulic resistance provided by the common constriction.

16. The shock absorber according to claim 1, wherein the two annular auxiliary chambers do not communicate with each other, but each of said annular auxiliary chambers communicates with the associated compensation chamber via a respective channel formed in the corresponding end of the tubular body, each channel being fitted with its own constriction.

17. The shock absorber according to claim 16, wherein the hydraulic resistance provided by the non-return means is always greater, in the closed position, than the adjustable hydraulic resistance provided by each constriction.

\* \* \* \* \*